Figure 1:
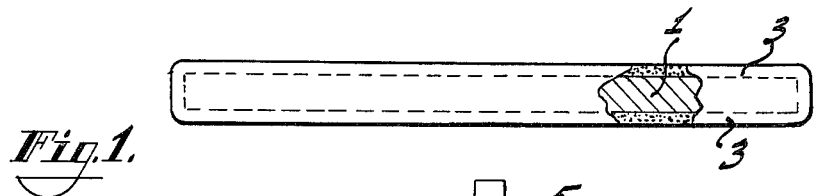

Jan. 25, 1966 H. B. LAW 3,231,380
ART OF MAKING ELECTRON-OPTICAL RETICLES
Filed Nov. 14, 1960

INVENTOR.
Harold B. Law
BY
Roderick Malcolm
Attorney 3,231,380
ART OF MAKING ELECTRON-OPTICAL RETICLES
Harold B. Law, Princeton, N.J., assignor to Radio Corporation of America, a corporation of Delaware
Filed Nov. 14, 1960, Ser. No. 68,908
1 Claim. (Cl. 96—36)

This invention relates to the art of making electron-optical reticles for use in cathode-ray tubes of the focus-mask variety.

Classified in accordance with their mode of operation, there are two kinds of "masked-target" cathode-ray tubes: (1) the "shadow-mask" variety, wherein the screen and its mask are maintained at the same potential to provide a field-free space through which electrons pass along substantially straight paths in approaching the screen, and (2) the "focus-mask" variety, wherein the mask is operated at a potential considerably lower than that of the screen to provide a beam-focusing electron-optical lens-field in the mask-to-screen space.

Cathode-ray tubes of the focus-mask variety are more efficient than cathode-ray tubes of the shadow-mask variety. The reason for this is that the concentrating effect of the lens-field upon the electron-beams or "jets" in a focus-mask tube permits the use of larger mask-apertures than can be used in a shadow-mask tube for the same size phosphor areas on the screen. Thus, other factors being equal, there are more electrons (and hence more light) available at the screen of a focus-mask tube than in a shadow-mask tube.

Although there are many advantages of focus-mask tubes which recommend their use in television receivers, the fact of the matter is that such tubes do not lend themselves readily to mass production methods. Why this is so will be apparent when it is recalled (a) that the conventional way of making an electron-sensitive mosaic screen involves the use of the tube's apertured mask as an optical mask in photographically laying-down the contiguous elemental phosphor areas of which the mosaic is formed, and (b) that where, as in the case of a focus-mask tube, the mask-holes may be as large or larger than the elemental phosphor areas of which the mosaic-screen is to be formed, any attempt to use the tube mask as an optical mask in the screen forming operation would result in oversize (and hence "overlapping" instead of contiguous) phosphor areas.

The foregoing problem of oversize phosphor areas has long been recognized and it has previously been proposed to give the mask its ultimate form and dimensions and then to "step down" the size of its apertures temporarily, i.e. during the screen-plotting operation, by electroplating the preformed metal with a substance which is opaque to the light rays used in the screen-plotting operation, and then to remove the coating or plating from the mask prior to mounting it within the tube. The electrodeposition methods of stepping down the mask-apertures, taught by the prior art, are expensive, not only because of the time factor involved and the cost of the relatively large quantities of coating material required in coating a preformed mask but also because of rejects resulting from the difficulty in achieving a high degree of uniformity in the dimensions of the stepped down apertures in the preformed metal. This last mentioned difficulty is especially pronounced when, as is usually the case, the apertured-mask takes the form of a spherically curved sheet metal structure.

The foregoing and other less apparent objections to the plating method of stepping down the dimensions of the apertures of a reticle or mask are minimized, in accordance with the invention, (a) by limiting the deposition of the opaque aperture-limiting substance to those surface areas of the mask material that define the walls of the apertures, and (b) by making the aperture coating or lining operation a step in the process of making the apertured metal sheet or "ribbon" from which the masks are eventually formed (instead of applying the coating to the mask per se, i.e., after the mask material has been shaped, annealed and framed).

The invention is described in greater detail in connection with the accompanying single sheet of drawings, wherein:

FIGS. 1 to 7, inclusive, are sectional views of a thin piece of metal at successive stages of its conversion, by the method of this invention, into a curved reticulated mask for use in a cathode-ray tube of the focus-mask variety.

Figure 2:
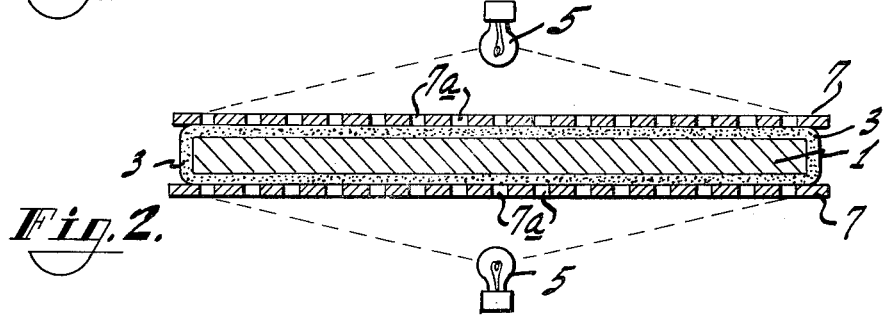
Figure 3:
Figure 4:
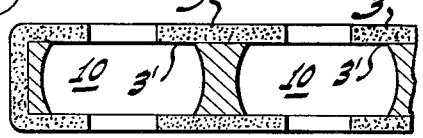

As above-mentioned, the present invention contemplates, and its practice provides, a novel method of making a curved apertured mask for use (a) in laying down a mosaic pattern of color-phosphors upon the screen plate of a cathode ray tube of the focus-mask variety, and (b) for subsequent use as an electron-optical element of said tube. In applying the invention to the manufacture of a curved mask (e.g. one comprising a circular section of a spherical shell) it is preferable to start with a thin (say 0.007" thick) flat sheet 1, FIG. 1, of ferrous metal (e.g., cold-rolled steel) of the requisite length and breadth and to coat it all over with a photoresist (e.g. photosensitized fish glue, or similar colloid) 3, FIG. 1. Next, as shown in FIG. 2, the photoresist on both major faces of the sheet metal is photographically exposed to light rays, from a bulb, or bulbs 5, through a negative photographic replica or replicas 7 of the pattern of apertures ultimately to be contained in the mask. Each replica 7 comprises (as a negative of the finished mask) an array of opaque dots 7a surrounded by a transparent field. Typical dimensions of the apertures, as measured at the center of the screen, are 0.015" to 0.018" and the spacing between aperture centers about 0.028". The resulting photograph or photographs are then developed, as by washing with water, to remove the resist only from those nonexposed areas 3a thereof (FIG. 3) beneath the dots 7a to uncover the metal areas 1a where the metal sheet 1 is to be perforated. The uncovered areas 1a of the metal sheet 1 are next subjected to an etchant (e.g., 40 Baumé ferric chloride solution) applied to one or both sides, either in the form of a spray or bath (not shown) to provide the sheet with apertures 10 (FIG. 4) of the ultimate pattern and size (e.g., 0.018") required in the finished kinescope. It will be observed upon inspection of FIG. 4 that the etchant may "undercut" the photoresist, as indicated at 3', so that the subsequent plating (FIG. 5) is confined to the side walls of the apertures. Thus, the minimum quantity of metal is required in stepping down the size of the apertures and greater uniformity is obtained in the stepped down dimensions of the apertures.

Figure 5:
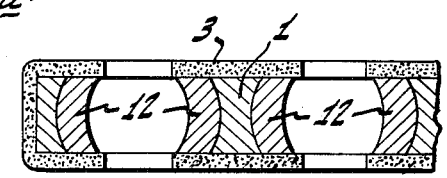

Referring to FIG. 5: With the light hardened areas of the resist 3 still covering the major surfaces of the now apertured sheet 1, a coating 12 constituted of an opaque nonferrous metal (e.g., copper, nickel or chromium), or other suitable light-opaque substance, is deposited, electrically (e.g., by electroplating, or cataphoretically) on the walls of the apertures, temporarily to decrease the dimensions of the apertures to that required in laying down a mosaic pattern of color phosphor areas upon the screen plate of the kinescope in which the finished mask is to be used. Because the mask material is still in the form of a flat sheet during the plating operation, the reduction in the dimension of the apertures is uniform over the entire sheet. The amount of such uniform reduction may be from say, 0.002" to, say 0.008" in diameter, the exact amount being chosen with a careful regard to the original diameter of the apertures and the ratio of screen-to-mask voltage to be used in the finished tube.

With the plating operation completed, the light-hardened photoresist 3 is next removed from the surfaces of the sheet as by washing it with sodium hydroxide or other caustic solution. When, as in the instant case, the sheet 1 is constituted essentially of a ferrous metal it should preferably be subjected to annealing (at a temperature of say 980° for, say thirty minutes) prior to forming it, on a suitably curved form (not shown) into its ultimate shape, shown in FIGS. 6 and 7. Next, when necessary or desirable, the curved sheet may be reinforced about its edge with a metal rim 14, FIGS. 6 and 7. Because the opaque lining 12 on the inner surfaces of the apertures 10 is integral with the sheet metal, the described forming and reforming operations leave said coating intact.

Figure 6:
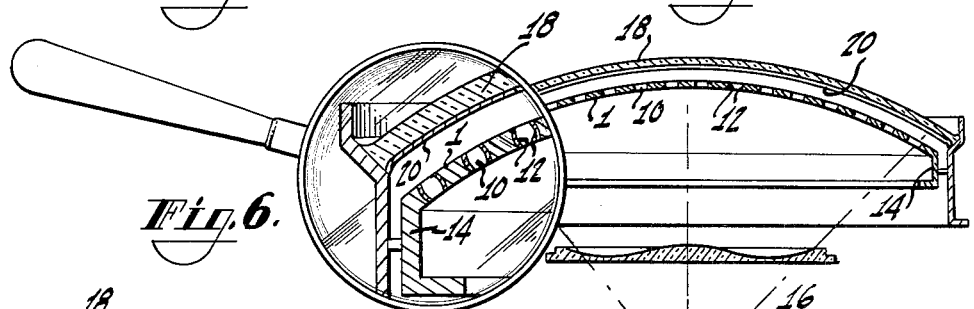

The apertured mask is now ready for use in a screen-plotting apparatus, such as the optical "lighthouse" 16 illustrated in FIG. 6, and described in detail by Epstein et al., U.S.P. 2,885,935. As shown more clearly in the magnified portion of FIG. 6, at this stage in the manufacture of the finished tube the diameter of the apertures in the mask 1 has been stepped down by the opaque lining 12 therein, to the diameter required to provide the screen plate 18 of the tube with phosphor dots of the proper size when the separately applied red, blue and green phosphor-containing photosensitive coatings 20 on the screen plate are exposed to light, from a suitably positioned point source 22 through said stepped down apertures.

Figure 7:
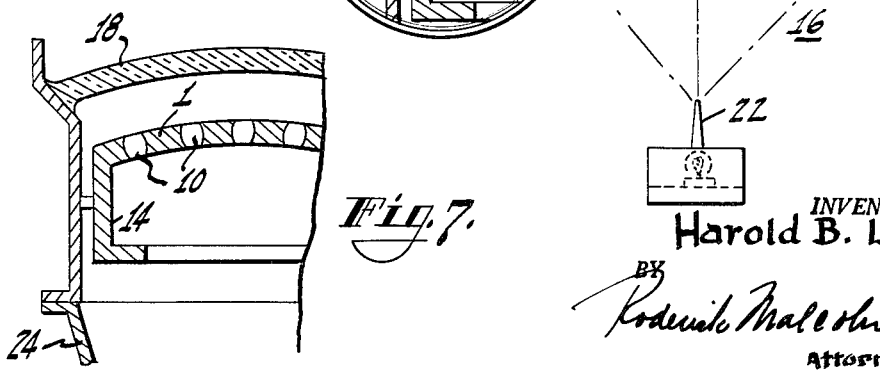

After the three photographic exposures have been made in the apparatus of FIG. 6, the opaque lining 12 must be "stripped" or otherwise removed from all of the mask-holes prior to mounting the mask for use as an electron-optical reticle within the kinescope bulb 24 (FIG. 7). When, as in the preferred embodiment of the invention, the mask is made of cold-rolled steel and the aperture lining consists of a nonferrous metal, the lining may be removed by washing the mask in a stripping solution, such as chromic acid, to which the mask material, per se, is immune.

What is claimed is:

Method of making a curved apertured mask for use (a) in laying down a mosaic pattern of color phosphors upon the screen plate of a cathode ray tube of the focus-mask variety, and (b) for subsequent use as an electron-optical element of said tube, said method comprising: applying a coating of photoresist to a sheet of ferrous metal, photographically exposing said photoresist to light rays through a negative replica of the pattern of apertures ultimately to be contained in said mask, developing the resulting photograph to remove the resist only from the areas of the metal that are to be perforated, subjecting said resist-free metal areas to an etchant to provide said coated metal sheet with apertures of the size dictated by said ultimate pattern, electrically depositing a nonferrous metal only on the walls of said apertures temporarily to decrease the dimensions thereof to the size required for said first mentioned use, chemically removing the light-hardened portion of said photoresist from said apertured sheet, annealing the ferrous metal of which said sheet is comprised, forming said annealed metal sheet into the desired curved mask-shape, and removing said nonferrous metal from the walls of said apertures subsequent to its first mentioned use and prior to mounting said curved apertured metal mask in said cathode-ray tube for use as an electron-optical element of said tube.

References Cited by the Examiner
UNITED STATES PATENTS

| | | | |
|---|---|---|---|
| 2,539,442 | 1/1951 | Larson | 204—24 X |
| 2,961,313 | 11/1960 | Amdursky et al. | |
| 3,070,441 | 12/1962 | Schwartz. | |

FOREIGN PATENTS

| | | |
|---|---|---|
| 866,065 | 7/1941 | France. |
| 634,217 | 9/1955 | Great Britain |

OTHER REFERENCES

RCA Tech. Notes (Kauffman) RCATN No. 149 (1958).

Swiggett, "Introd. to Printed Circuits," 1956, Rider Publisher Inc., N.Y., pp. 25–42.

NORMAN G. TORCHIN, *Primary Examiner.*

MILTON STERMAN, *Examiner.*